Nov. 11, 1930.   F. MAXWELL   1,781,186
CANE CRUSHING APPARATUS
Filed June 23, 1927   6 Sheets-Sheet 1
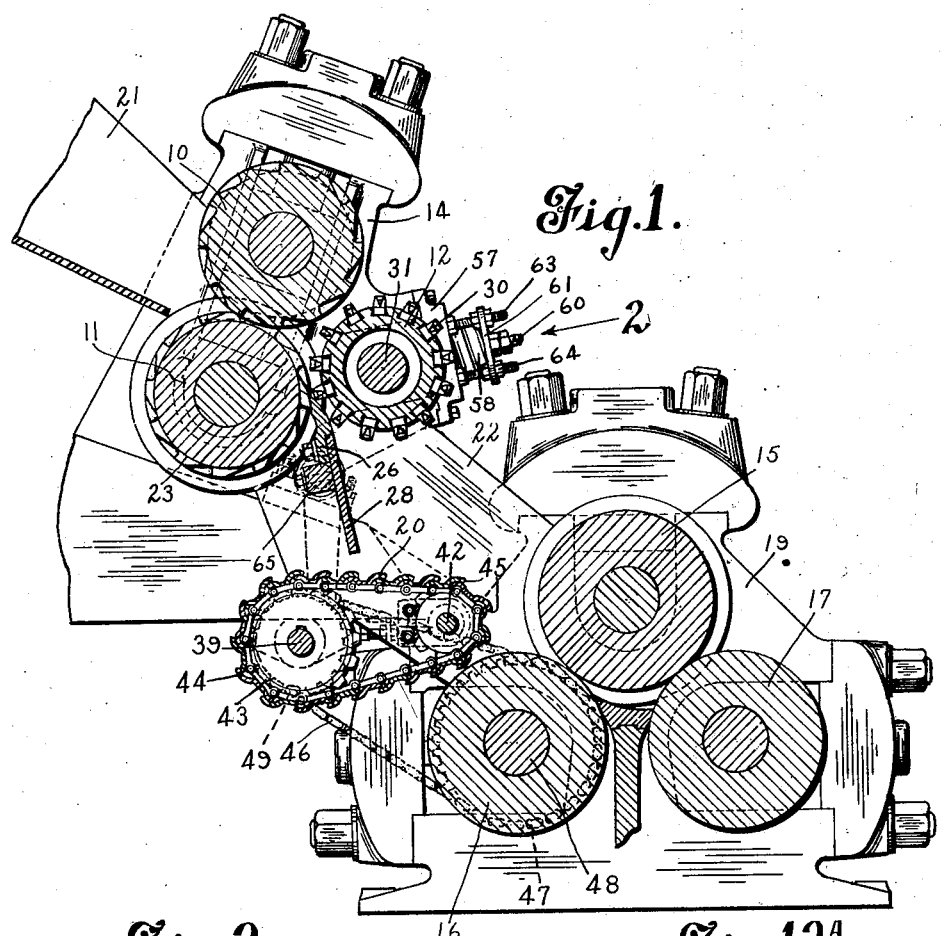
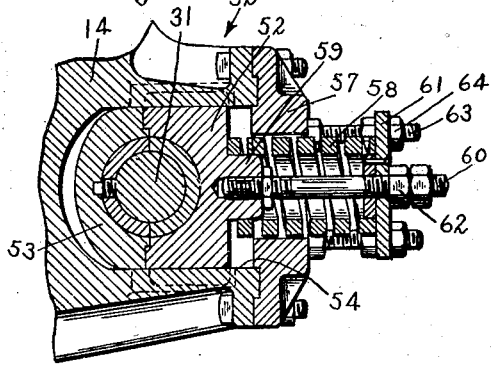
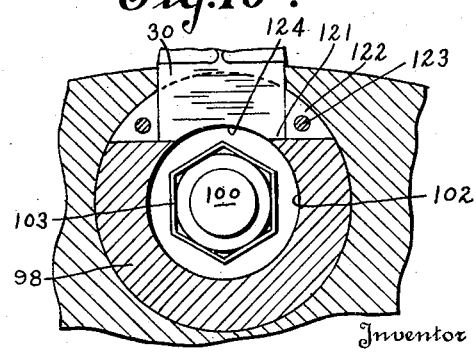
Inventor
Francis Maxwell
By Rockwell and Bartholow
Attorneys Nov. 11, 1930.  F. MAXWELL  1,781,186
CANE CRUSHING APPARATUS
Filed June 23, 1927  6 Sheets-Sheet 2
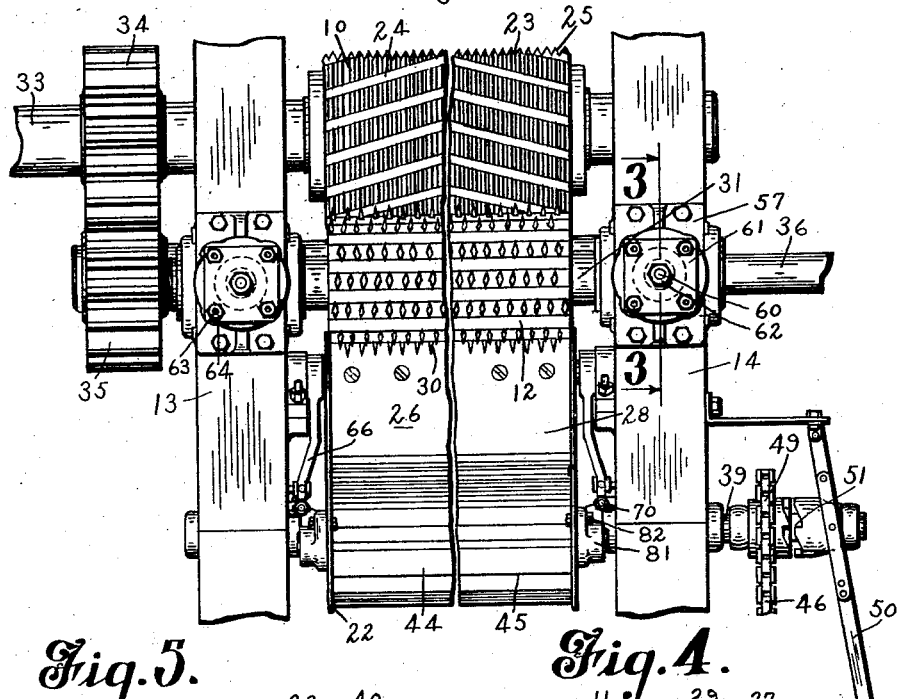
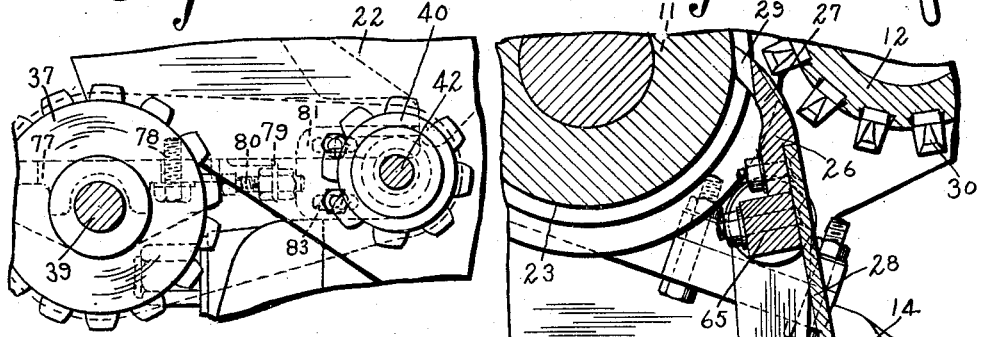
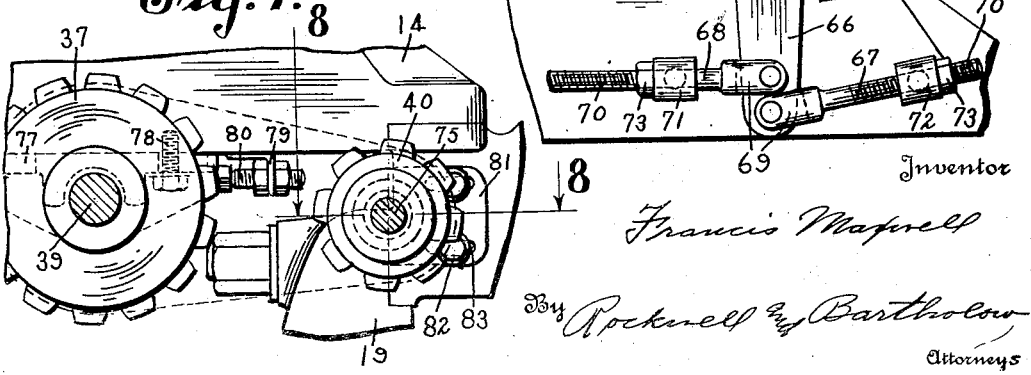

Inventor
Francis Maxwell
By Rockwell & Bartholow
Attorneys

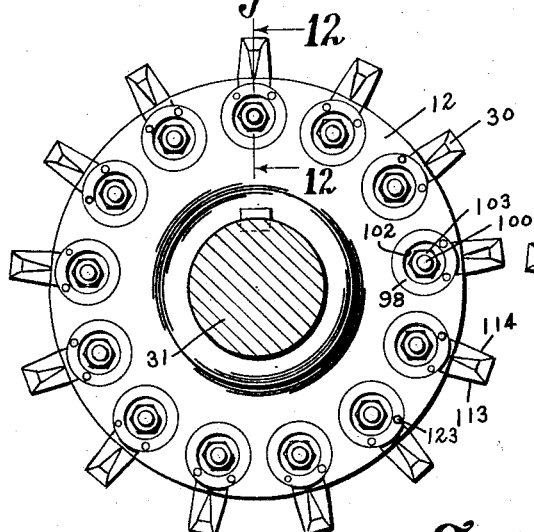
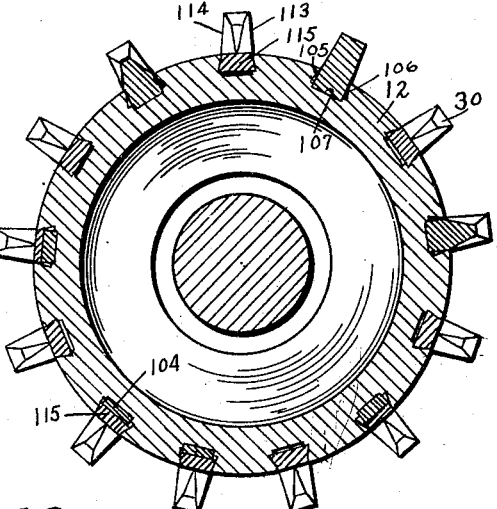
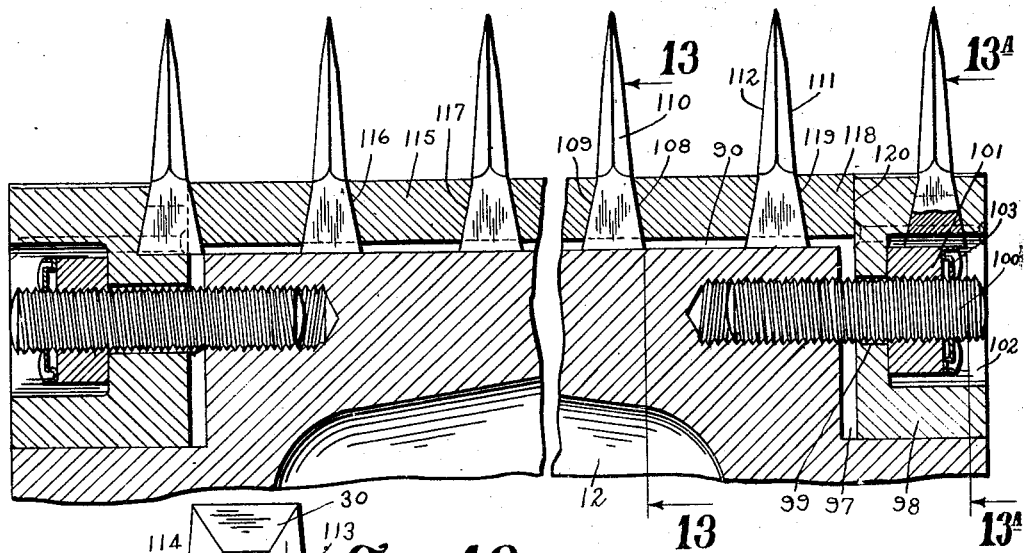
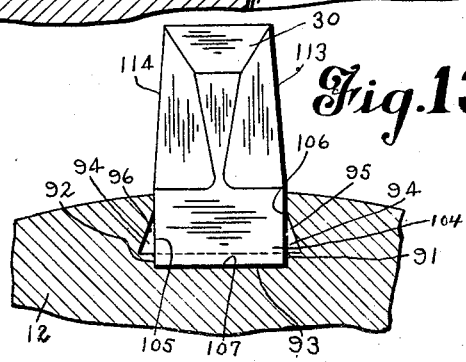

Nov. 11, 1930.    F. MAXWELL    1,781,186
CANE CRUSHING APPARATUS
Filed June 23, 1927    6 Sheets-Sheet 5

Inventor
Francis Maxwell
By Rockwell and Bartholow
Attorneys

Nov. 11, 1930.   F. MAXWELL   1,781,186
CANE CRUSHING APPARATUS
Filed June 23, 1927    6 Sheets-Sheet 6

Patented Nov. 11, 1930

1,781,186

UNITED STATES PATENT OFFICE

FRANCIS MAXWELL, OF WALLINGTON, ENGLAND

CANE-CRUSHING APPARATUS

Application filed June 23, 1927. Serial No. 200,893.

This invention relates to sugar cane crushing apparatus, and more particularly to improvements in that type of cane crushing apparatus wherein the cane is crushed and then comparatively finely shredded before it is fed to subsequently arranged juice expressing mills. While the cane is in this shredded condition, it is generally desirable that it be fed and delivered to a juice expressing mill as rapidly as possible. The first mill, therefore, is preferably arranged as closely adjacent the crushing and shredding unit as is practicable, and means is provided whereby the cane may be rapidly carried away from the crushing and shredding unit and forced toward the rolls of the mill.

The cane crushing apparatus of this invention contemplates the use of a new and improved form of shredding roll, in combination with a pair of pressure rollers which may be grooved or not, as desired. The machine illustrated, is similar in type to that shown and described in my copending application, Serial No. 623,847, filed March 9, 1923, and in some respects is an improvement thereover in the general combination of parts, in the structure of the principal mechanisms and the novel combination thereof with a mill and its associated parts. In addition to these, and in combination therewith, a novel form of shredding roll having a novel form of teeth thereon by the use of which more efficient shredding of the cane is obtained, is also contemplated.

The principal object of this invention is to provide in cane crushing apparatus, an improved and efficient form of shredding roll.

Another object of this invention is to provide upon the periphery of a shredding roll, an improved form of tooth and to arrange and secure the teeth thereon in a novel and efficient manner.

Other objects of this invention are to provide in cane crushing apparatus, novel means in cane shredding roll bearings, means to rapidly feed the shredded cane away from the crushing and shredding unit, and to generally improve the structure of this type of cane crushing apparatus, whereby the cane will be more efficiently prepared for subsequent juice expressing operations.

To these and other ends this invention consists in the novel features and combinations of parts to be hereinafter described and claimed.

In the accompanying drawings:

Fig. 1 is a sectional side elevation of a sugar cane crushing apparatus, embodying the features of this invention;

Fig. 2 is a view of the same, looking in the direction of arrow 2 of Fig. 1;

Fig. 3 is a section on line 3—3 of Fig. 2;

Fig. 4 is an enlarged sectional view of the scraper bar for one of the crusher rolls and of the associated parts, as shown in Fig. 1;

Fig. 5 is a detail view of parts associated with the cane feeding mechanism;

Fig. 7 is a view similar to Fig. 5, but showing a somewhat modified arrangement of the parts;

Fig. 10 is an end view of the same;

Fig. 11 is a section on line 11—11 of Fig. 9;

Fig. 12 is an enlarged longitudinal section through the roll on line 12—12 of Fig. 10;

Fig. 13 is a section on line 13—13 of Fig. 12;

Fig. 13A is a section on line 13A—13A of Fig. 12;

Figure 6:
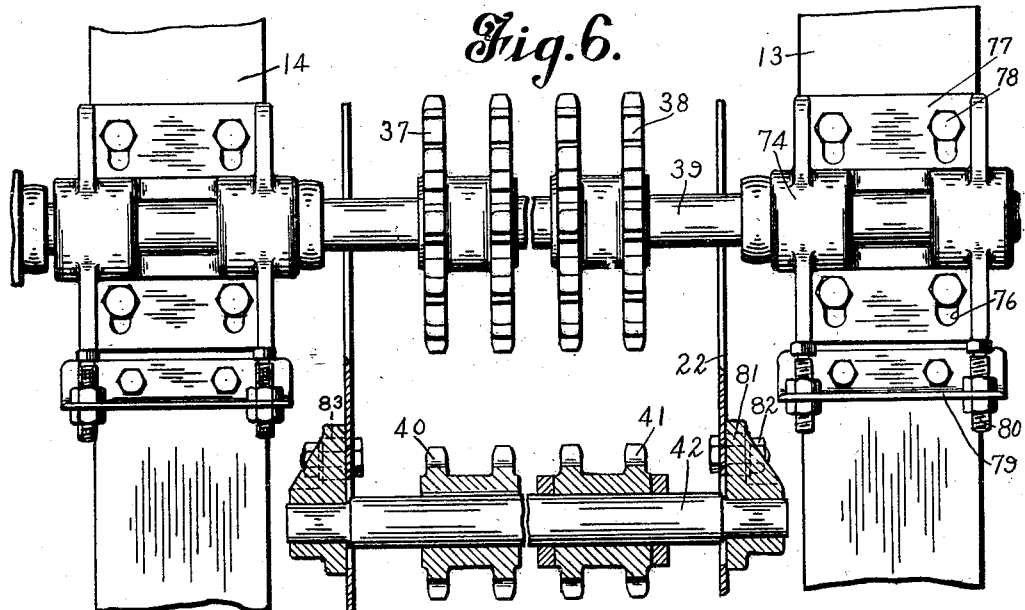
Fig. 6 is a plan view of the part shown in Fig. 5, certain parts being shown in section for the sake of clearness.

The cane crushing apparatus selected to illustrate the features of this invention generally comprises cooperating crushing rolls 10 and 11, a shredding roll 12, all of which are rotatably mounted between standards 13 and 14, a set of juice expressing rolls 15, 16 and 17 rotatably mounted between standards 18 and 19, and a cane feeding mechanism 20. Suitable cane guiding means, such as the chutes 21 and 22 respectively, guide the cane to the crushing rolls 10 and 11, and from them to the mill rolls 15 and 16.

The crusher rolls 10 and 11, in this instance, are each provided with peripheral grooves 23, intersected by substantially longitudinally extending grooves 24. The peripheral grooves 23 are preferably V-shaped in cross section and form peripheral ribs 25 on each roll. The ribs 25 of one roll are adapted to mesh between the corresponding ribs upon the other roll in the groove 23 therebetween. The scraper bar 26 suitably supported between the standards 13 and 14 and having a toothed edge 27, and an apron plate 28, is provided. The teeth 29 of the scraper bar 26 feed into the grooves 23 of the roll 11 to relieve them of the crushed cane adhering thereto.

The shredder roll 12 is provided with a plurality of teeth 30, which are secured to the roll and arranged thereon in such a manner that they may be readily removed therefrom, and that no tooth will be peripherally in line with another. The roll 12 is provided with trunnions 31, which are rotatably mounted in bearings 32, disposed one in each of the side frames of standards 13 and 14. The bearings 32 are disposed with respect to the crusher rolls 10 and 11 and the scraper bar 26 so that the teeth 30 of the roll 12 will act in cooperation with both the roll 11 and the bar 26 to shred cane passing between them and the roll 12. Preferably, the arrangement is such that the greater amount of shredding will take place between the roll 12 and the scraper bar 26, and substantially as soon as the cane emerges from the rolls 10 and 11 and is relieved from the roll 11 by the teeth 29 of the scraper bar.

The rolls 10 and 11 are preferably driven at a comparatively slow rate of speed by any suitable means in driving engagement with the shaft 33, the rolls being geared together by the gears 34 and 35. The roll 12 is preferably driven at a comparatively high rate of speed by suitable driving means engaging the trunnion end 36. Due to the rapid rotation of the shredder roll 12, the cane acted upon by the tooth 30 will be torn, cut, split and shredded into substantially fine shreds of fibrous form. The shredded cane is in a more or less fluffy mass, and if not engaged and compressed substantially as soon as formed, would require considerable space to receive it. Provision is therefore provided by the use of the feed mechanism 20 for feeding this shredded cane as rapidly as it is formed toward and between the rolls 15 and 16 of the juice expressing mill.

The feeding mechanism 20 comprises the spaced apart pairs of sprockets 37 and 38, secured upon shaft 39, and 40 and 41 secured on shaft 42. The pairs of sprockets are drivingly connected together by the chain 43 upon which are secured carrier and feeding bars 44. Each bar 44 presents a transversely extending shoulder 45, which engages the shredded cane and forces it into the bite of the cooperating rolls 15 and 16 of the mill. The sprocket wheels 37 and 38 are driven at a somewhat faster speed than the rolls 15 and 16, being geared thereto by a chain 46 engaging a sprocket 47 secured upon the shaft 48 of the roll 16, and a sprocket 49 rotatably mounted upon the shaft 39. Driving connection between the sprocket 49 and the shaft 39 is obtained by manipulation of a clutch handle 50 to operate a clutch 51, suitable for this purpose.

Each of the shredder roll bearings 32 comprises a bearing block 52, a bearing cap 53, and means to resiliently secure the same to the standards 13 or 14, within a passageway 54, formed therein. A cap piece 57 is secured to the adjacent standard and extends across the passageway 54 from the end of one wall of the passageway to the other. The cap piece 57 is provided with an opening which permits the passage of a coiled compression spring 58. The spring 58 fits about a boss 59 formed upon the outer face of the bearing block 52, and abuts the outer face thereof adjacent the periphery of this boss. A stud bolt 60 is secured to the boss 59 and extends outwardly through the spring 58 and through a cross bar 61. A nut 62 engages the outer end of the bolt 60, and limits the action of the spring 58 against the block 52, adjustably retaining the block against inward movement in excess of a predetermined amount. The cross bar 61 is adjustably secured to the cap piece 57 by stud bolts 63. The cross bar 61 may be disposed in various positions with respect to the cap piece 57 by proper manipulation of a nut 64, associated with the bolt 63. Proper adjustment of both the cross bar 61 and the nut 62 on the bolt 60 may be effected, to vary the tension of the spring 58. Adjustment of either, individually, permits the disposition of the bearing 32 and therefore the roll 12 toward or away from the scraper bar 26 and roll 11. The spring 58 permits a movement of the roll 12 away from these associated parts automatically, for instance, when the associated parts are threatened by the delivery thereto of an excessive amount of cane.

The scraper bar 27 and apron 28 are secured to a supporting bar 65, rotatably mounted between the standards 13 and 14. An arm 66 secured to the bar 65 extends downwardly therefrom at each side of the scraper bar adjacent the standards. A pair of adjusting rods 67 and 68 are provided for each arm 66. The rods 67 and 68 are each provided with an arm engaging portion 69, which is pivotally secured to the lower end thereof. The rods 67 and 68 are also provided with a threaded portion 70, adapted to be received and to pass through brackets 71 and 72. The brackets 71 and 72 are disposed one at either side of the arm 66 and are pivotally secured to the adjacent standard. A nut 73 threadedly engages the portion 70 of these rods, and by manipulation thereof permits the adjustment of the scraper bar 27 toward or away from the roll 11 and the roll 12.

Figure 8:
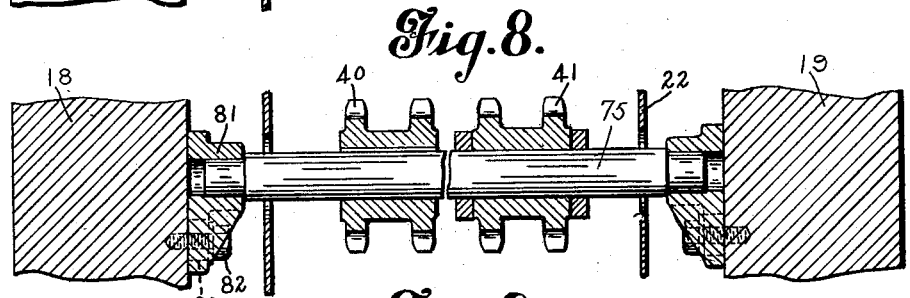
Fig. 8 is a section on line 8—8 of Fig. 7.
Figure 9:
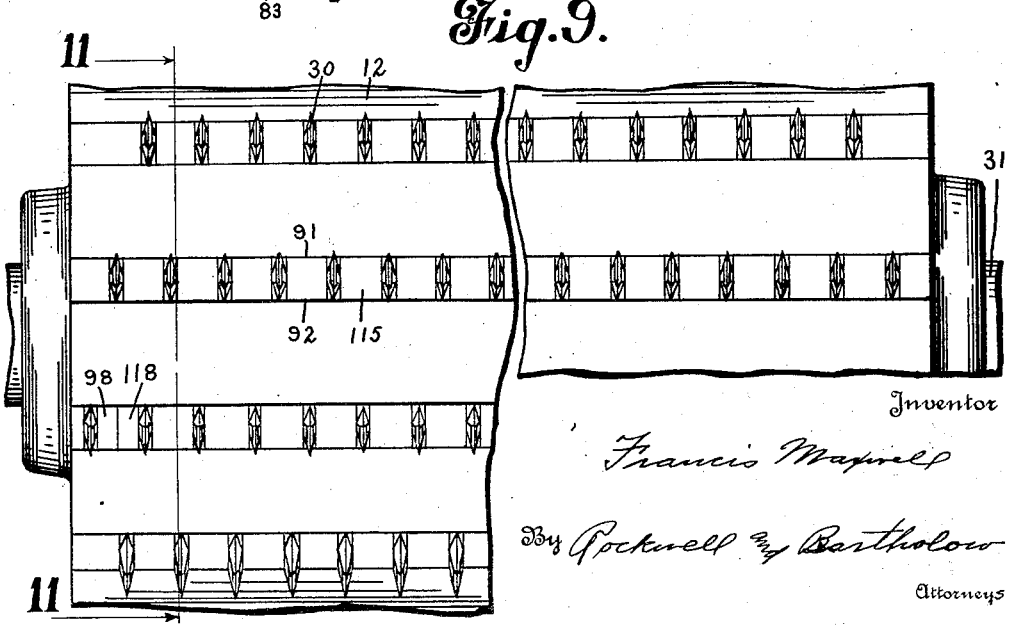
Fig. 9 is a partial face view of a shredding roll, adapted for use in the machine of this invention.
Figure 14:
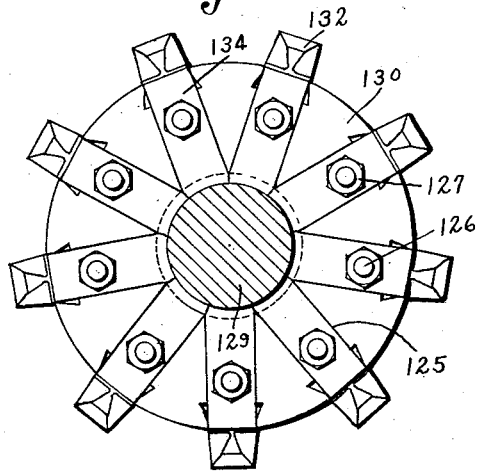
Fig. 14 is an end view of a somewhat modified form of shredder roll.
Figure 15:
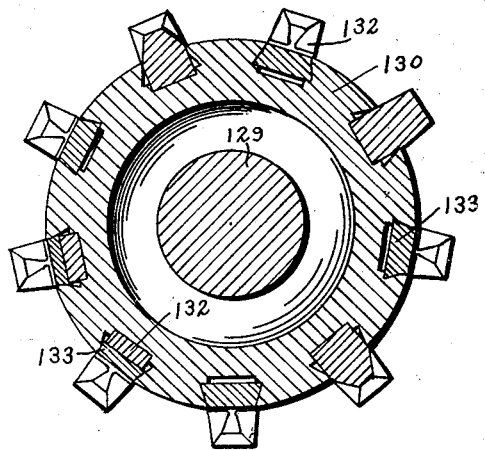
Fig. 15 is a cross sectional view of the roll shown in Fig. 14.
Figure 16:
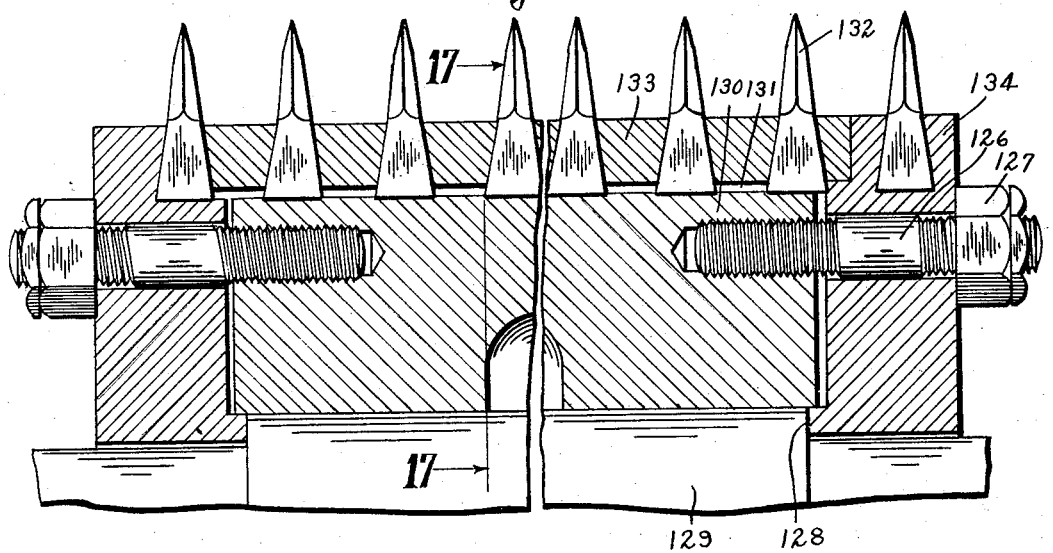
Fig. 16 is a longitudinal sectional view of the same.
Figure 17:
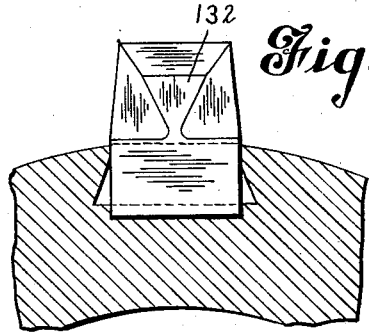
Fig. 17 is a section on line 17—17 of Fig. 16.

The shaft 39 of the feeding mechanism 20 shown in Figs. 5 and 6, and of the modified arrangement thereof shown in Figs. 7 and 8, is supported by bearings 74, one secured to each of the standards 13 and 14. The bearings 74 are each provided with means for adjustment so that the shaft 39 may be moved toward or away from the shaft 42 in Figs. 5 and 6, or shaft 75 in Figs. 7 and 8. This means comprises elongated openings 76 in the base 77 of the bearing 74, through which pass bolts 78 for securing the same to the respective standard. An angle plate 79 is provided and secured to the standard adjacent each bearing 74. An adjusting screw 80 extends from the angle plate 79 toward and into engagement with the adjacent bearing 74. The proper manipulation of the adjusting screw 80, after loosening the bolts 78, permits the movement of the bearings 74 to adjust the shaft 39, as desired.

The shaft 42 of Figs. 5 and 6, and shaft 75 of Figs. 7 and 8, are supported by a bearing member 81, which in the first instance is secured to the side wall plates of the cane chute 22, and in the latter instance, to the standards 18 and 19 by means of bolts 82, which pass through elongated openings 83 in the members 81. Due to the provision of the elongated openings 83, the members 81 are adjustable toward and away from the shaft 39, whereby the relative positions of the shafts 39 and 42 in one instance, and shafts 39 and 75 in the other instance, may be varied. By the provision of the above adjusting features with respect to the mounting of the shafts 39, 42 and 75, the feeding mechanism 20 may be disposed in various positions with respect to the rolls of the mill, so as to permit an efficient feeding of the shredded cane toward and into the same.

The roll 12 is provided with a plurality of longitudinally extending grooves 90, which are equally spaced about the periphery thereof. Each of the grooves 90 is formed with straight sides 91 and 92, and a flat bottom 93. Spaced from the grooved bottom 93 and at each side thereof, the groove is provided with an extension 94, the sides 95 and 96 formed by this extension converging toward the periphery of the roll and intersecting the straight sides 91 and 92 below the roll periphery, forming a dove tail shaped passageway intermediate the bottom of the groove and the periphery of the roll.

Each of the grooves 90 communicates at each end of the roll with a counter bore 97 formed therein and having its axis parallel with the axis of the roll. An end clamp 98 is disposed and fitted in each of the counter bores 97. The portion of the outer periphery of the clamp 98, adjacent the periphery of the roll, overlaps the adjacent end of the groove 90. Each clamp 98 is provided with an opening 99 through which a stud 100 extends. The stud 100 is threaded into the end of the roll 12 and is engaged by a nut 101, which cooperates therewith to force the clamp 98 inwardly toward the roll or to release it therefrom. In this instance, the nut 101 is set into the clamp 98 within a counter bore 102 therein. A pal-nut 103 is preferably threaded upon the end of the stud 100, which extends beyond the nut 101 to clean the threads thereof, and thus assist in the removal of the nut 101.

Each of the teeth 30 is provided with a base portion 104, generally rectangular in shape and having opposed straight sides 105 and 106, which fit into the groove 90, between the sides 91 and 92 thereof, with the bottom 107 of the tooth resting upon the groove bottom 93. The other sides of the base portion 104 taper from the bottom 107 upwardly and toward each other as at 108 and 109. Continuing from substantially the point where the tapered sides 108 and 109 of the base portion 104 meet the periphery of the roll 12, each tooth is provided with a blade portion 110.

Sides 111 and 112 of the blade portion 110 continue from the tapered sides 108 and 109 of the base portion, and taper toward each other toward the outer end thereof. Adjacent the outer end of the blade portion, the sides 111 and 112 taper to a greater degree and converge to form a substantially keen edge. At the sides 113 and 114 of the blade portion that continue from the straight sides 105 and 106 of the base portion 104, the blade portion sides 111 and 112 converge toward each other to form substantially keen side edges.

Spacing blocks 115 of suitable length are provided and formed to fit in the dove tail shaped portion of the groove 90 between the sides 95 and 96 thereof. The blocks 115 are formed at each end 116 and 117 to fit the taper on the sides 108 and 109 of the base portion 104 of each tooth 30. A sufficient number of end blocks 118 is provided, each having a tapered end 119 and a straight end 120, the latter being provided for engagement with the clamp 98.

When it is required that a tooth 30 be disposed upon the roll 12, adjacent one of the ends thereof, the clamp 98 is grooved as at 121, and filler pieces 122 are provided and pinned to the clamp by suitable means 123. The filler pieces 122 engage the tooth 30 to hold the same in place. In some instances, the tooth 30 is recessed at its bottom surface as at 124, to provide clearance for the nut 101. The teeth 30 are assembled upon the roll 12 generally as shown in Fig. 12, the first tooth being either spaced from the clamp 98 by a block 118, set into a groove in the end of the clamp 98 or in a groove 121 in the clamp 98. The required number of spaced blocks 115 are longitudinally inserted into the dove tail shaped portion of the groove 90, and a tooth 30 is then placed radially into the groove between each space block 115. Having assembled the space blocks 115 and the teeth 30 as desired in the groove 90, they may be securely clamped and secured to the roll 12 by tightening the nuts 101 upon the stud 100 to draw the clamps 98 toward each other and toward the end of the roll 12. The cooperation between the dove tail shaped portion of the groove 90 and the engaging sides of the space block 115, prevents these blocks from displacement radially. The engagement of the ends 116 and 117 of the space blocks 115, with the tapered sides 108 and 109 of the base portion 104 of each tooth, prevents the displacement of the teeth radially from the roll. By loosening the clamp 98 at either end of the roll any one of the teeth in the series of teeth in the respective grooves may be radially removed and another readily inserted in its place.

By varying the disposition of the teeth 30 longitudinally in each groove, no tooth upon the periphery of the roll is at any time peripherally in line with another. This may be accomplished by locating the first tooth at one end of each groove a greater or less distance from that end, and using space blocks 115 of such length that the subsequent teeth in each groove are equally spaced apart. By such an arrangement a maximum amount of shredding will be obtained inasmuch as each tooth will be individually acting upon the cane and not following after another tooth.

The roll 130 shown in Figs. 14 to 17 inclusive, is provided with grooves 131 on the periphery thereof, teeth 132 and space blocks 133, all of which are generally similar in structure and shape to the corresponding parts described above. The clamp members 134 are of a somewhat modified form, although the use and operation thereof is the same as that described above relative to clamp 98. The roll 130 is provided with a plurality of radially extending grooves 125 in each end face into which the clamps 134 are fitted. Each of these grooves communicates with one of the grooves 131. A stud bolt 126 and a cooperating nut 127 for drawing the clamp 134 toward the end of the roll 130 is provided. The inner end of the clamp 134 abuts a shoulder 128 upon the roll shaft 129. Tightening the nut 127 rocks the clamp 134 about the fulcrum point formed by the engagement of the inner end of the clamp with the shoulder 128, and draws the outer end of the clamp 134 into clamping engagement with the adjacent tooth 132 or space block 133, disposed in the adjacent groove 131.

Figure 18:
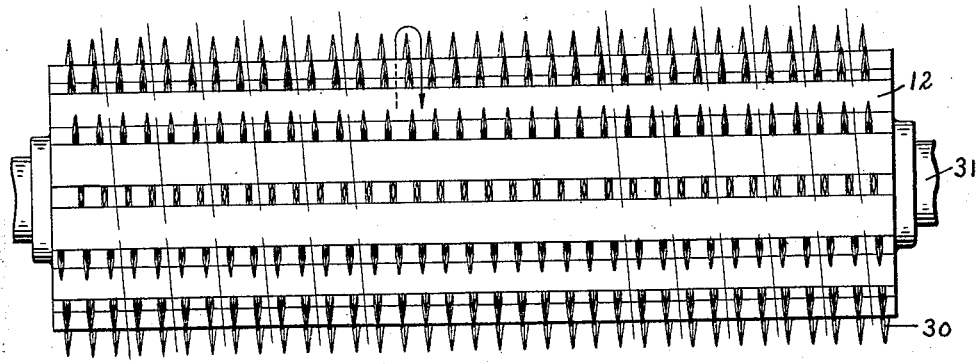
Fig. 18 is a view showing an arrangement of the teeth on the shredder roll.

The teeth 30 and 132 may be arranged on the shredder roll so as to be in effect in spiral formation. In some cases the teeth follow one another about the roll throughout its length in one substantially sharp spiral of a pitch equal to the axial dimension between a tooth of one row and a tooth of the next row. This arrangement is illustrated in Fig. 18.

Figure 19:
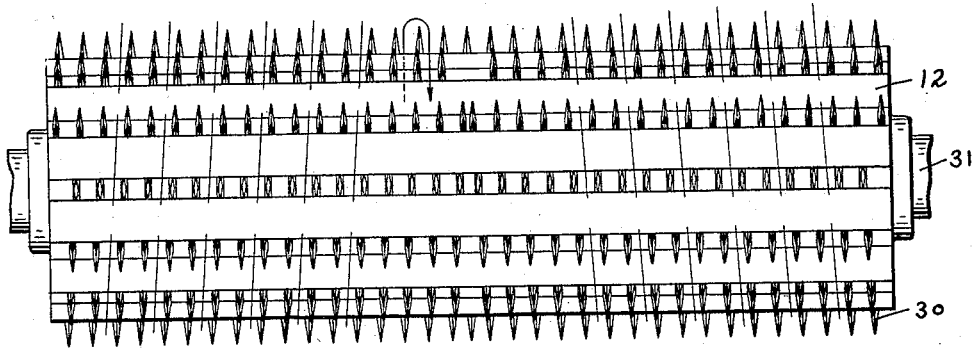
Fig. 19 is a view showing a somewhat similar arrangement of the same.

In other cases, it will be preferable to arrange the teeth on the rolls in such a manner that the spiral formation will begin at each end of the roll and lead toward the center or intermediate portion thereof in oppositely directed spirals. This latter arrangement is illustrated in Fig. 19. A particular advantage of the latter arrangement is that it will create a slight tendency of the cane to feed toward the roll center or intermediate portion. This will obviate any possibility of the cane packing up at either end of the roll between the latter and the casing, and creating a tendency to choke. This latter arrangement may be termed a herringbone arrangement of teeth.

The operation of the cane crushing apparatus above described, is as follows: Sugar cane or the like, is guided down chute 21 and passes between the crusher rolls 10 and 11, where it is pressed and crushed. The crushed cane then emerges from between these rolls and before it can expand, and in some instances, while it is still held thereby, the teeth 30 on the shredder roll 12 attack it and tear, shred and otherwise disintegrate it into a thoroughly shredded and fibrous mass. The support provided by the scraper bar 26, either acting in unison with the roll or separately in cooperation with the teeth 30 of the shredding roll 12, assists in the shredding operation. The novel structure of the teeth 30 of the roll 12, materially assists in the efficient shredding of the cane. The spring 58 allows the shredder roll bearing 32 to recede, carrying with it the shredder roll 12 whenever the mass of crushed cane threatens to overcrowd the shredding roll.

After being shredded the mass of cane fibre is directed toward the rolls 15 and 16 of the adjacent juice expressing mill by the chute 22 and the apron plate 28. The carrier bars 44 acting, as above described, upon this mass of cane fibres, feeds the same rapidly toward the rolls 15 and 16 and forces it into the bite thereof.

The above described structures and combinations thereof form an efficient sugar cane crushing apparatus by which a maximum amount of cane may be prepared for subsequent juice extracting operations and thereby to obtain a maximum amount of sugar juice therefrom by the consumption of a minimum amount of power. The cost of operation and upkeep of a device embodying the novel features of this invention is comparatively small, due to the provision of the adjustable features of many of the mechanisms included and the ease by which others may be replaced when broken or damaged, during the operation thereof.

While I have shown and described a preferred embodiment of my invention, it is to be understood that the same is not limited to all of the details shown, as many modifications and variations are possible, which will lie within the spirit of the invention and the scope of the appended claims.

What I claim is:

1. In cane crushing apparatus, a roller having a groove extending lengthwise thereof, a series of spacing blocks slidably retained to the roller in the groove therein, teeth between said blocks, said teeth being of increased width at their bottoms in the direction of the spacing blocks, said spacing blocks being shaped to fit the lower ends of the tooth and adapted to engage said teeth to secure them to said roller.

2. In cane crushing apparatus, a roller having a groove extending lengthwise thereof, and an opening in the end thereof communicating with the groove, spacing blocks in the groove, teeth between the spacing blocks, said teeth being provided with ends diverging in the direction of the spacing blocks, and means in the end opening of said roller adapted to clamp the blocks and teeth together to secure the teeth to said roller.

3. A cane working roller, comprising a cylindrical body having a longitudinally extending groove in the periphery thereof and opening radially outwardly, a plurality of teeth insertable radially into said groove, a plurality of spacing blocks shaped to fit said groove and insertable longitudinally thereinto, a space block between each tooth and the next, and means at the end of said roller to clamp said teeth and blocks together in the groove to secure the teeth to the roller.

4. In cane crushing apparatus, a roller having a plurality of removable teeth extending from the periphery thereof, each of said teeth having a base portion, the base portion of each tooth being adapted to radially enter an opening in said roller, and means to secure the teeth to said roller, said means being slidably engaged by said roller and adapted to clampingly engage the base portion of said teeth.

5. In cane crushing apparatus, a roller having a plurality of removable teeth extending from the periphery thereof, each of said teeth having a base portion, the base portion of each tooth being adapted to radially enter an opening in said roller, a space block between each pair of said teeth, said space block being slidably engaged by said roller and being adapted to engage said base portion of each of the adjacent teeth to secure them to said roller.

6. A tooth for a cane working roller, said tooth having a base portion and a blade portion, said base portion having longitudinally extending straight edges and tapering sides, said blade portion having longitudinally extending cutting edges and sides, the cutting edges of said blade portion merging into the straight edges of said base portion, and the sides of said blade portion merging into the tapering sides of said base portion.

7. A tooth for a cane working roller, said tooth having a base portion and a blade portion, said base portion having longitudinally extending straight edges and tapering sides, said blade portion having longitudinally extending cutting edges and sides, the cutting edges of said blade portion merging into the straight edges of said base portion, and the sides of said blade portion merging into the tapering sides of said base portion, and a cutting edge across the outer end of said blade portion interconnecting the longitudinally extending cutting edges thereof.

In witness whereof, I have hereunto set my hand this 20th day of May, 1927.

FRANCIS MAXWELL.